US012576472B2

(12) United States Patent
Liu et al.

(10) Patent No.: US 12,576,472 B2
(45) Date of Patent: Mar. 17, 2026

(54) MATERIAL CUTTING AND GRINDING DEVICE

(71) Applicant: Industrial Technology Research Institute, Hsinchu (TW)

(72) Inventors: Shih-Yi Liu, Kaohsiung City (TW); Yu-Fang Huang, Nantou County (TW); Jung-Hsuan Chen, Hsinchu County (TW); Shen-Chuan Lo, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 349 days.

(21) Appl. No.: 18/531,759

(22) Filed: Dec. 7, 2023

(65) Prior Publication Data

US 2024/0416478 A1     Dec. 19, 2024

(30) Foreign Application Priority Data

Jun. 19, 2023    (TW) ................................. 112122922

(51) Int. Cl.
B24B 27/06          (2006.01)
B23D 59/02          (2006.01)
(Continued)

(52) U.S. Cl.
CPC ............ *B24B 27/06* (2013.01); *B23D 59/025* (2013.01); *B24B 23/026* (2013.01); *B24B 55/06* (2013.01); *B26D 7/1854* (2013.01)

(58) Field of Classification Search
CPC ....... B24B 27/06; B24B 23/026; B24B 55/06; B23D 59/025; B26D 7/1854
See application file for complete search history.

(56) References Cited

U.S. PATENT DOCUMENTS

| 2,378,070 | A | | 6/1945 | Eastwood | |
| 3,609,931 | A | * | 10/1971 | Voorhies | B24B 55/02 |
| | | | | | 451/450 |

(Continued)

FOREIGN PATENT DOCUMENTS

| CN | 2579604 | Y | 10/2003 |
| CN | 100400232 | C | 7/2008 |

(Continued)

OTHER PUBLICATIONS

TW OA issued on Jun. 5, 2024.

*Primary Examiner* — Eldon T Brockman
(74) *Attorney, Agent, or Firm* — WPAT, PC

(57) ABSTRACT
A material cutting and grinding device is provided. The material cutting and grinding device includes a shaft, a rotor assembly, a cutting grinding sheet, a fixture and a channel set. The rotor assembly includes a housing, a rotor, an air intake opening, blades and accommodating grooves. The rotor is accommodated in a holding groove of the housing. The rotor is sleeved on the shaft. The accommodating grooves are passed through the rotor. The blades are passed through the accommodating grooves. The cutting grinding sheet is connected to the other end of the shaft. The fixture clamps the cutting grinding sheet. The channel set includes a shaft channel and a gas channel. The shaft channel is passing through the shaft. The gas channel is disposed on the fixture. The gas channel is connected to the shaft channel.

13 Claims, 11 Drawing Sheets

(51) Int. Cl.
    *B24B 23/02*        (2006.01)
    *B24B 55/06*        (2006.01)
    *B26D 7/18*         (2006.01)

(56)             References Cited

U.S. PATENT DOCUMENTS

| | | | | |
|---|---|---|---|---|
| 4,870,946 | A * | 10/1989 | Long | B23D 59/025 |
| | | | | 83/171 |
| 9,302,411 | B2 * | 4/2016 | Kahkonen | B28D 1/047 |
| 11,090,658 | B2 | 8/2021 | Pallmann | |
| 2014/0238375 | A1 | 8/2014 | Kahkonen et al. | |
| 2016/0059370 | A1 * | 3/2016 | Matsuyama | B23D 59/025 |
| | | | | 409/136 |
| 2016/0121449 | A1 * | 5/2016 | Cao | B24B 23/026 |
| | | | | 451/344 |
| 2016/0268593 | A1 | 9/2016 | Vogler et al. | |
| 2023/0045014 | A1 * | 2/2023 | Fukazawa | B26D 7/088 |

FOREIGN PATENT DOCUMENTS

| | | | | | |
|---|---|---|---|---|---|
| CN | 102148414 | A | | 8/2011 | |
| CN | 202264120 | U | | 6/2012 | |
| CN | 202291670 | U | | 7/2012 | |
| CN | 202534755 | U | | 11/2012 | |
| CN | 203622453 | U | | 6/2014 | |
| CN | 107344291 | A | | 11/2017 | |
| CN | 207038657 | U | | 2/2018 | |
| CN | 207104579 | U | | 3/2018 | |
| CN | 207563003 | U | | 7/2018 | |
| CN | 105789727 | B | | 9/2018 | |
| CN | 112355841 | A | | 2/2021 | |
| DE | 102011075967 | A1 * | 11/2012 | | B27B 5/32 |
| GB | 855283 | A * | 11/1960 | | B24D 5/16 |
| JP | 2001-38622 | A | | 2/2001 | |
| JP | 5459825 | B2 | | 4/2014 | |
| KR | 101323870 | B1 * | 10/2013 | | B23D 47/12 |
| TW | 194638 | U | | 11/1992 | |
| TW | 411286 | B | | 11/2000 | |
| TW | 201010823 | A | | 3/2010 | |
| TW | I438059 | B | | 5/2014 | |
| TW | 201607668 | A | | 3/2016 | |
| TW | I676312 | B | | 11/2019 | |
| TW | M604264 | U | | 11/2020 | |
| TW | 202307939 | A | | 2/2023 | |

* cited by examiner

MATERIAL CUTTING AND GRINDING DEVICE

CROSS REFERENCE TO RELATED APPLICATION

This application claims the benefits of Taiwan application Serial No. 112122922, filed on Jun. 19, 2023, the disclosures of which are incorporated by references herein in its entirety.

TECHNICAL FIELD

The present disclosure relates in general to a material cutting and grinding device.

BACKGROUND

Traditional grinding and polishing methods used to improve the quality of the cross-section of the sample often add polishing fluid to remove heat and scraps remaining on the cross-section of the sample. However, when preparing samples of environmentally sensitive materials, polishing fluid is usually used to treat the cross-section of the samples in order to remove heat and scraps generated during grinding. In this case, the environmentally sensitive materials (such as lithium, sodium, potassium, magnesium, calcium, etc.) may interact with the water, oxygen, or acid-base chemicals contained in the polishing fluid.

Furthermore, the power of the traditional driving blade cutting is from electric or pneumatic means, and the removal of heat and scraps requires additional power or materials such as the above-mentioned polishing liquid. The mechanism needs to take into account the location of the power source of the blade cutting and the location of the power source (or material) that removes the heat.

SUMMARY

The present disclosure relates to a material cutting and grinding device, which uses gas as the cutting and grinding power to drive the cutting grinding sheet, and at the same time provides removal of scraps and heat after cutting and grinding, and provides a corresponding gas environment in response to the material.

The material cutting and grinding device according to an embodiment of the present disclosure includes a shaft, a rotor assembly, a cutting grinding sheet, a fixture and a channel set. The rotor assembly includes a housing, a rotor, an air intake opening, an air outtake opening, multiple blades and multiple accommodating grooves, wherein the housing includes a holding groove. The rotor is accommodated in the holding groove. The rotor is sleeved on the shaft. The air intake opening and the air outtake opening are respectively penetrated at different positions of the housing, and the air intake opening and the air outtake opening are respectively connected to the holding groove. The accommodating grooves are arranged in a radial direction of the rotor. The blades are respectively correspondingly passed through the accommodating grooves, and one end of the blades can protrude out of the rotor. The cutting grinding sheet is connected to the other end of the shaft. The fixture is sleeved on the shaft. The fixture is used for clamping the cutting grinding sheet.

The channel set includes a shaft channel and at least one gas channel. The shaft channel is penetrated through the shaft, and the gas channel is arranged on the fixture. The gas channel is connected to the shaft channel. A gas enters the holding groove from the air intake slot and the gas pushes the blades to drive the rotor and the shaft to rotate, thereby driving the cutting grinding sheet and the fixture to rotate. In the same time, the gas passes through the shaft channel and the gas channel, and further flows to the surface of the cutting grinding sheet.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

The following examples are listed and described in detail in conjunction with the accompanying drawings, but the provided examples are not intended to limit the scope of the present disclosure. In addition, the drawings are only for illustration purposes and are not drawn to original scale. In order to facilitate understanding, the same elements will be described with the same symbols in the following description.

Terms such as "including", "comprising", and "having" mentioned in this disclosure are all open terms, that is, "including but not limited to".

In the description of various embodiments, when terms such as "first", "second", "third", "fourth" etc. are used to describe elements, they are only used to distinguish these elements from each other, and do not limit the order or importance of the elements.

In the description of various embodiments, the so-called "coupling" or "connection" may refer to two or more elements being in direct physical or electrical contact with each other, or indirect physical or electrical contact with each other, and "coupling" or "connection" may also refer to two or more elements operating or acting with each other.

Figure 1:
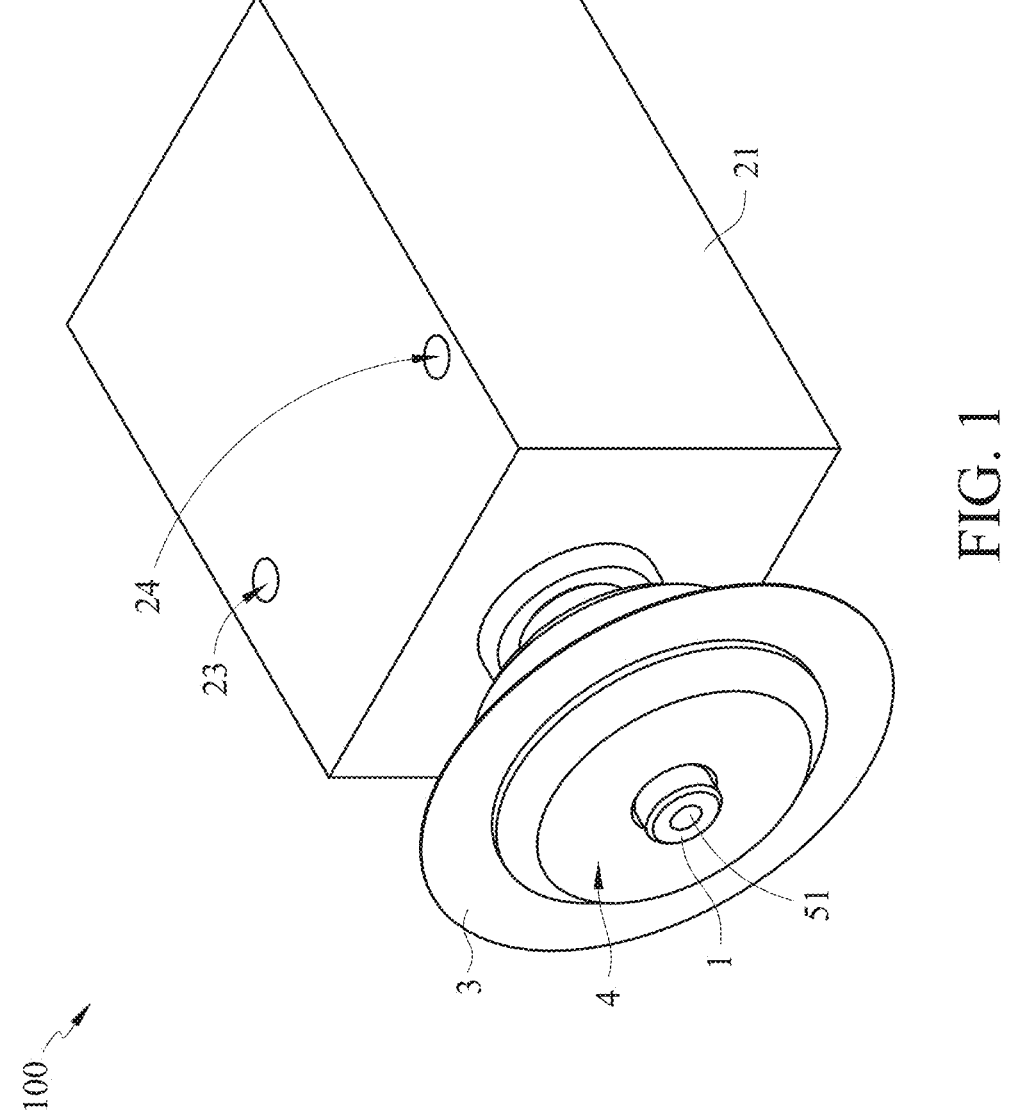
FIG. 1 is a schematic view of an embodiment of a material cutting and grinding device in accordance with this disclosure.
Figure 2:
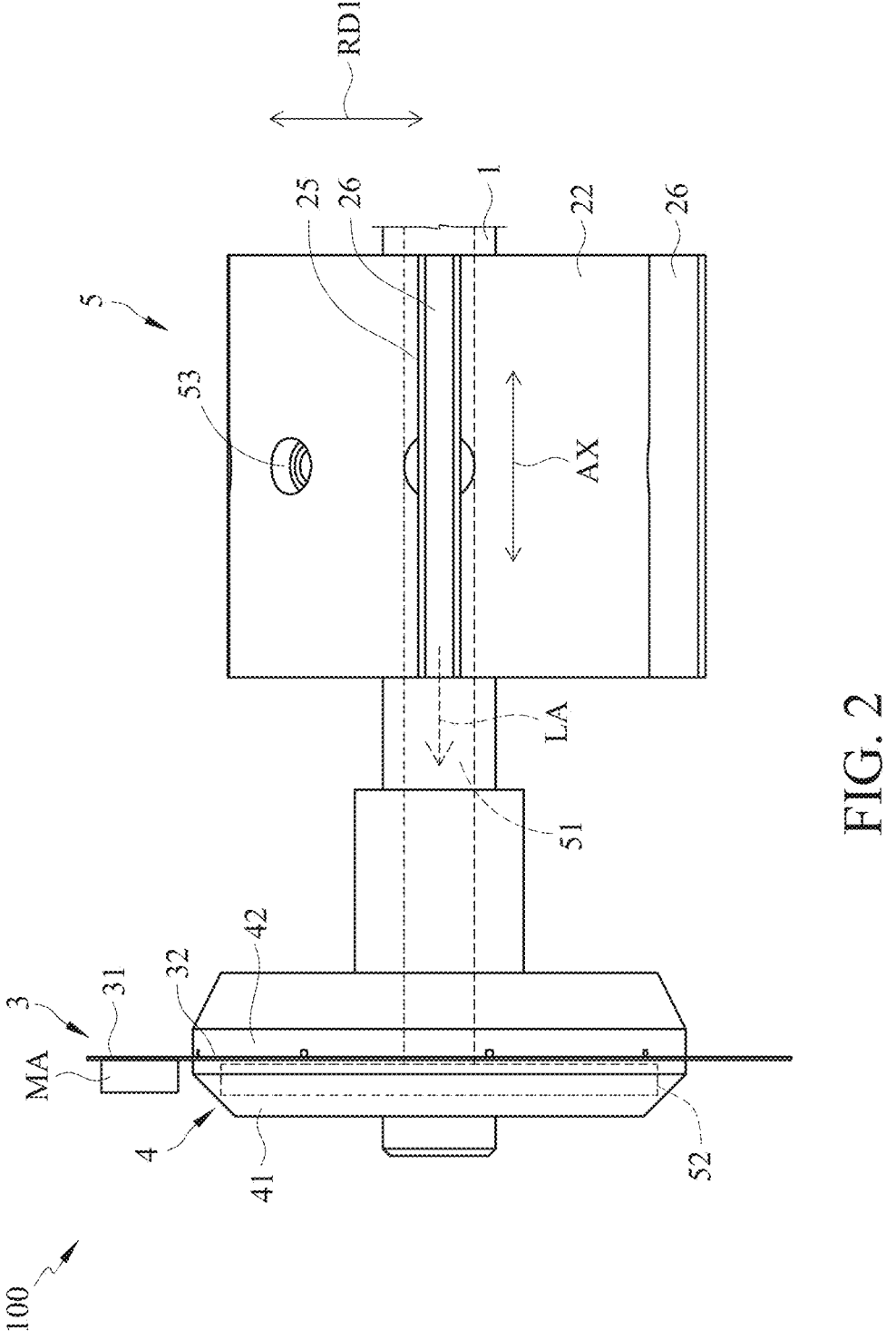
FIG. 2 is a side partial perspective schematic view of FIG. 1.
Figure 3:
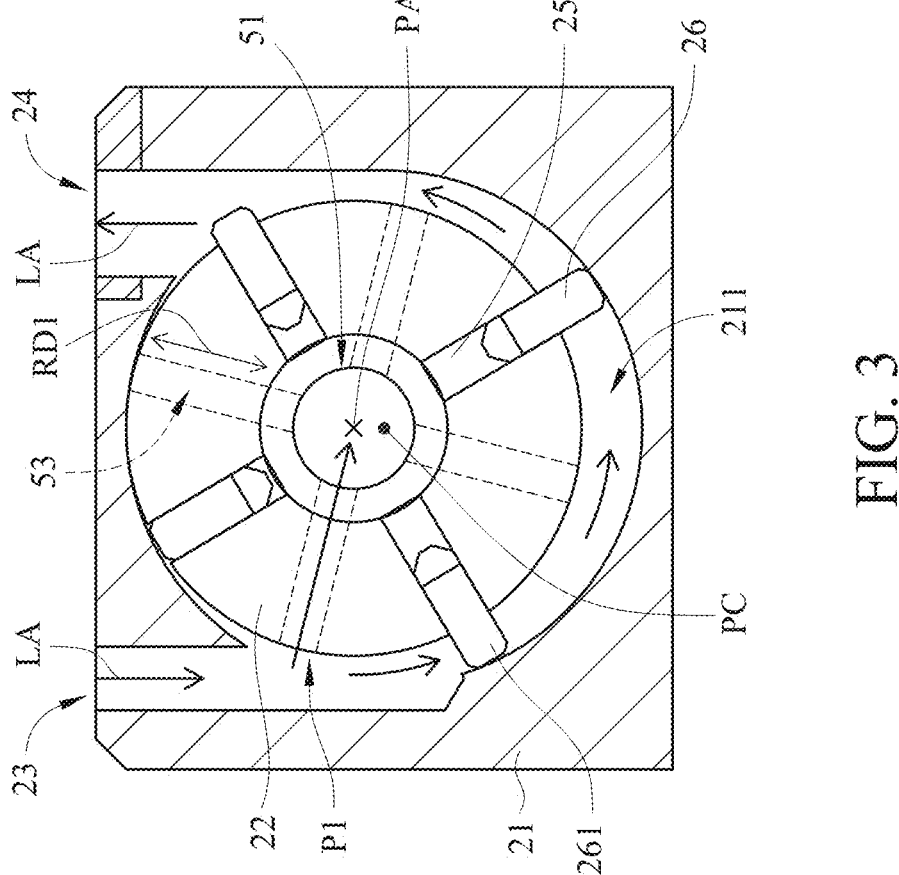
FIG. 3 is a schematic view of an embodiment of a rotor inside a housing in accordance with this disclosure.

FIG. 1 is a schematic view of an embodiment of a material cutting and grinding device in accordance with this disclosure. FIG. 2 is a side partial perspective schematic view of the material cutting and grinding device in FIG. 1. FIG. 3 is a schematic view of an embodiment of a rotor inside a housing in accordance with this disclosure. Please refer to FIG. 1 to FIG. 3, the material cutting and grinding device 100 disclosed in this embodiment comprises a shaft 1, a rotor assembly 2, a cutting grinding sheet 3, a fixture 4 and a channel set 5. Wherein, the rotor assembly 2 is disposed on one end of the shaft 1, the cutting grinding sheet 3 is connected to the other end of the shaft 1, and the fixture 4 is sleeved on the shaft 1 and is used for clamping the cutting grinding sheet 3.

The rotor assembly 2 includes a housing 21, a rotor 22, an air intake opening 23 and an air outtake opening 24, a plurality of accommodating grooves 25 and a plurality of blades 26. Wherein the housing 21 has a holding groove 211, and the holding groove 211 is used to accommodate the rotor 22. The rotor 22 is a hollow cylinder, defines a radial direction RD1 and an axial direction AX, and allows the shaft 1 to pass through along the axial direction AX. In other words, the rotor 22 is sleeved on the shaft 1.

The air intake opening 23 and the air outtake opening 24 are respectively penetrated at different positions of the housing 21, and the air intake opening 23 and the air outtake opening 24 are respectively connected to the holding groove 211. There is one air intake opening 23 and one air outtake opening 24, and the present disclosure does not limit the number and shape of the air intake opening 23 and the air outtake opening 24.

A plurality of accommodating grooves 25 are provided in the radial direction RD1 of the rotor 22, passed through the outer surface of the rotor 22, and provided for the blades 26 to be disposed. A plurality of blades 26 are correspondingly disposed in the accommodating grooves 25 and can move relative to the accommodating grooves 25. One end 261 of each of the blades 26 can protrude out of the rotor 22.

Figure 4:
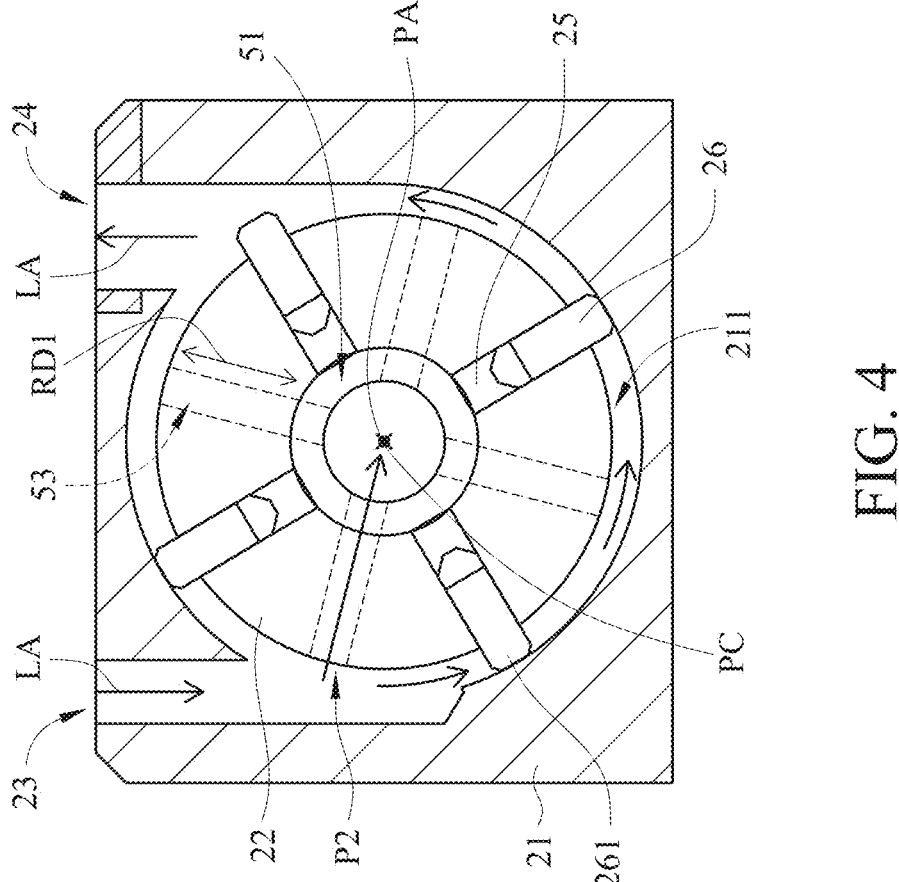
FIG. 4 is a schematic view of another embodiment of the rotor inside the housing in accordance with this disclosure.

As shown in FIG. 3, the cross section of the holding groove 211 is approximately circular and has a center position PC, and an axis position PA of the rotor 22 deviates from the center position PC. That is to say, the rotor 22 of the present disclosure is located at a first position P1 in the housing 21, and disposed in an eccentric manner with respective to the housing 21. However, the present disclosure is not limited thereto. In another embodiment, as shown in FIG. 4, the axis position PA of the rotor 22 coincides with the central position PC, that is, the rotor 22 is located at a second position P2 in the housing 21, and disposed in a concentric manner with respect to the housing 21.

Figure 5:
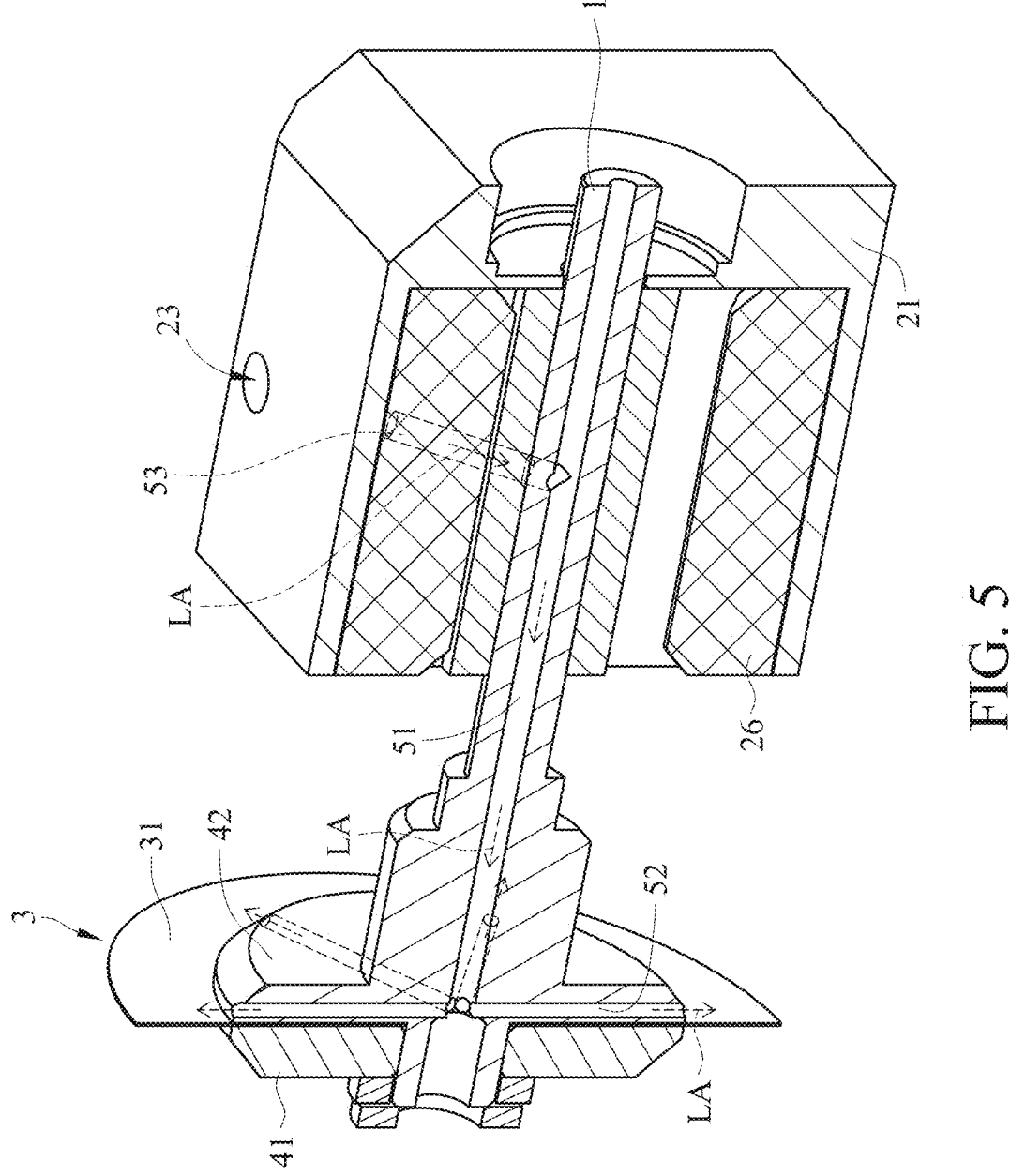
FIG. 5 is a partial cross-sectional schematic view of the material cutting and grinding device in FIG. 1.
Figure 6:
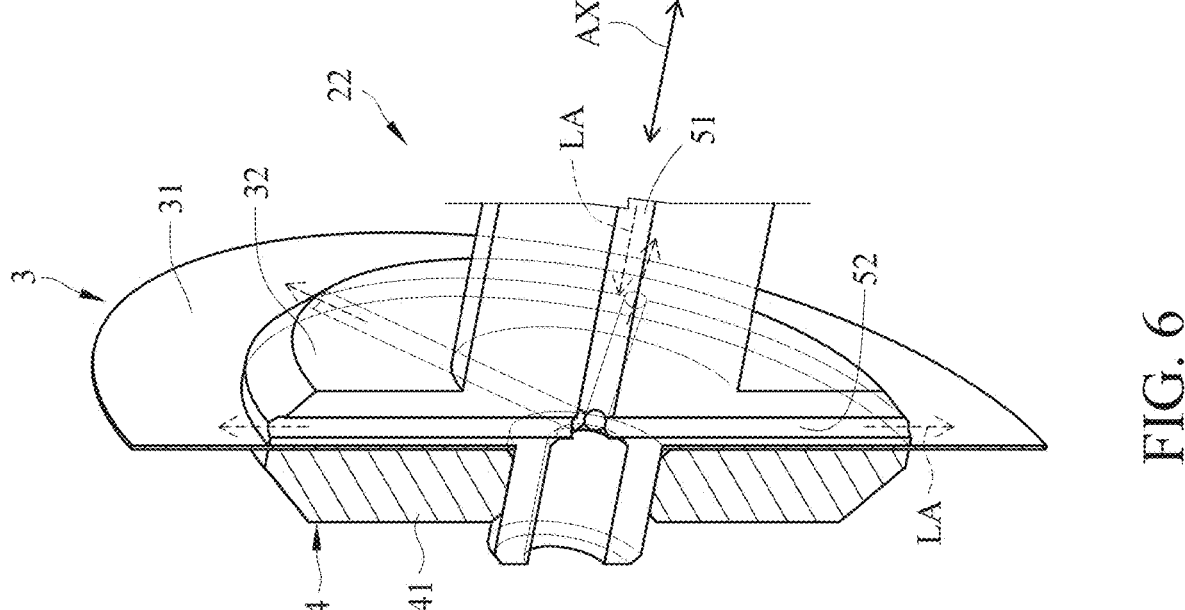
FIG. 6 is a schematic view of an embodiment of gas flow to a surface of a cutting grinding sheet in accordance with this disclosure.

FIG. 5 is a partial cross-sectional schematic view of the material cutting and grinding device in FIG. 1, and FIG. 6 is a schematic view of an embodiment of gas flow to the surface of the cutting grinding sheet. Please refer to FIG. 5 and FIG. 6, the cutting grinding sheet 3 includes a cutting area 31 and a body area 32, the cutting area 31 is arranged around the body area 32, and the body area 32 is a portion that overlaps the fixture 4 in the axial direction AX of the rotor 22, and the cutting area 31 is a portion not overlapping with the fixture 4 along the axial direction AX. The cutting area 31 is used for cutting and grinding the sample MA as shown in FIG. 2. Wherein, the cutting grinding sheet 3 is any sheet with cutting or grinding functions such as a grinding wheel sheet, a tungsten steel sheet, a diamond sandpaper sheet, etc., which is not limited in this disclosure.

The fixture 4 includes a first clamping block 41 and a second clamping block 42, the first clamping block 41 and the second clamping block 42 are arranged on both sides of the cutting grinding sheet 3, thereby fixing the cutting grinding sheet 3.

The channel set 5 includes a shaft channel 51, at least one gas channel 52 and a plurality of rotor channels 53. The shaft channel 51 penetrates through the interior of the shaft 1 along the axial direction AX of the rotor 22. Each gas channel 52 is provided on the fixture 4, and each gas channel 52 is respectively connected to the shaft channel 51. The rotor channels 53 are set on the radial direction RD1 of the rotor 22, so that one end of each the rotor channel 53 is opened on the outer surface of the rotor 22, and the other end of each the rotor channel 51 is connected to the shaft channel 51. As shown in FIG. 3 and FIG. 4, the positions of the rotor channels 53 and the positions of the accommodating grooves 25 are staggered. It can be seen that a gas flow path is formed by the rotor channels 53, the shaft channel 51 and the gas channel 52. In one embodiment, the gas channel 52 is disposed on the first clamping block 41. However, the present disclosure is not limited thereto. In other embodiments, the gas channel 52 may be disposed on the second clamping block 42, or the number of the gas channel 52 may be more than one and respectively disposed on the first clamping block 41 and the second clamping block 42.

Figure 7B:
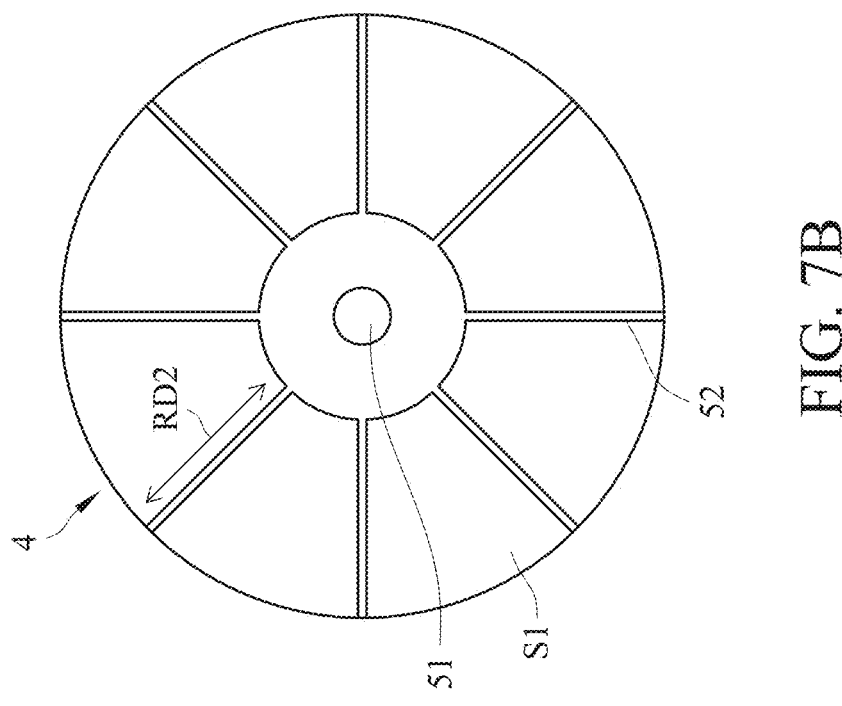
FIG. 7B is a schematic perspective view of another embodiment of the gas channel arranged on the fixture in accordance with this disclosure.
Figure 7A:
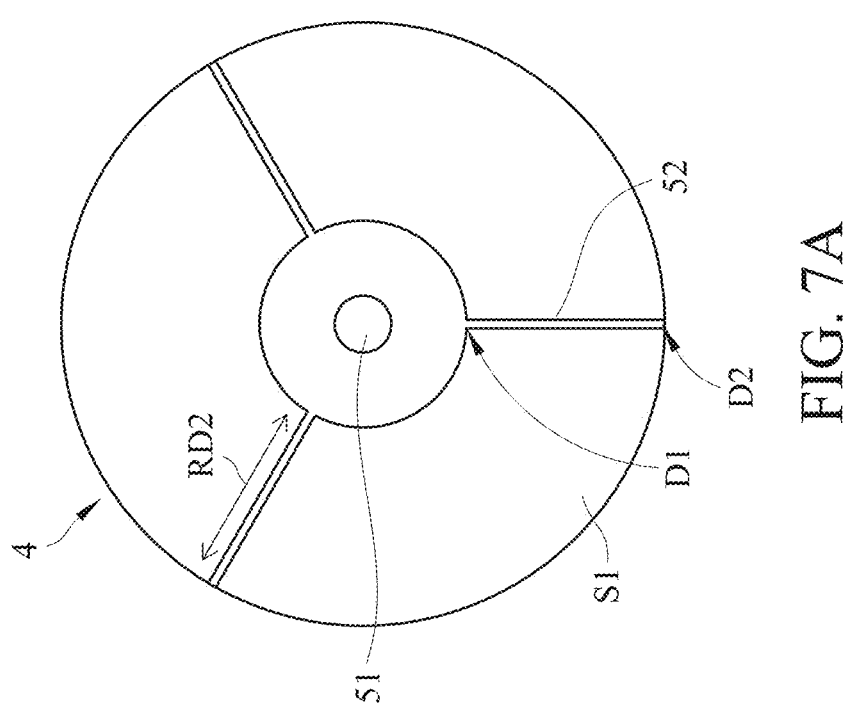
FIG. 7A is a schematic view of an embodiment of a gas channel arranged on a fixture in accordance with this disclosure.

FIG. 7A is a schematic view of an embodiment of the gas channel arranged on the fixture. Please refer to FIG. 7A, in one embodiment, the gas channel 52 is formed in a concave manner on a surface S1 of the fixture 4, that is, the gas channel 52 may be a groove formed on the fixture 4. Further, there are multiple gas channels 52. As shown in FIG. 7A, there are three gas channels 52, and each gas channel 52 is arranged along a radial direction RD2 of the fixture 4. These gas channels 52 are a plurality of grooves distributed radially on the surface S1 of the fixture 4.

One end of the shaft channel 51 is located at the center of the surface S1 of the fixture 4. The gas channel 52 includes a first end D1 and a second end D2 opposite to each other. The shaft channel 51 communicates with the first end D1 of the gas channel 52, and the first end D1 of the gas channel 52 extends along the radial direction RD2 of the surface S1 of the fixture 4 to the second end D2 of the gas channel 52. In this embodiment, the second end D2 is, for example, at the peripheral position of the surface S1 of the fixture 4, that is, the gas channel 52 communicates with the shaft channel 51 and extend to the peripheral position of the surface S1 of the fixture 4. However, the present disclosure is not limited thereto, the second end D2 can also be designed at any position on the surface S1 of the fixture 4 except the peripheral position.

As shown in FIG. 7A, the number of the gas channels 52 is three. However, the present disclosure does not limit the number of the gas channels 52. In other embodiments, there may be one gas channel, or as shown in FIG. 7B: the number of the gas channels 52 is eight. In addition, this disclosure does not limit the form of the gas channel 52. In FIG. 7A and FIG. 7B, the gas channels 52 are linear channels. In other embodiments, the gas channels can also be curved channels or other types of channels.

The following describes the gas flow direction and the operational relationship of each component when the present disclosure is used. Please refer to FIG. 3 to FIG. 6, under the above configuration, a gas LA can enter in the holding groove 211 from the air intake opening 23, push the blades 26 to drive the rotor 22 and the shaft 1 to rotate, so as to drive the cutting grinding sheet 3 and the fixture 4 to rotate. After the cutting grinding sheet 3 rotates, it can perform cutting and grinding actions on the sample MA, and the gas LA flows through the gas channel 52 from the shaft channel 51, and then flows to the surface of the cutting grinding sheet 3. It can be seen from that the material cutting and grinding device 100 of the present disclosure, not only using the gas LA as the cutting and grinding power to drive the cutting grinding sheet 3, can also jet the gas LA to the surface of the cutting grinding sheet 3 to remove the scraps and the heat generated by cutting and grinding, thereby protecting the cutting grinding sheet 3 and the sample MA.

In detail, as shown in FIG. 3 and FIG. 4, when the gas LA enters the holding groove 211 through the air intake opening 23, part of the gas LA will follow the outer surface of the rotor 22 to push the one ends 261 of the blades 26. At this time, one ends 261 of the blades 26 telescopically moves outside the accommodating groove 25 due to the influence of centrifugal force, and protrudes from the outer surface of the rotor 22. When the blades 26 are moved to the air outtake opening 24, part of the gas LA is thus dispersed from the air outtake opening 24. The blades 26 are interlocked with the rotor 22 and the rotor 22 is also interlocked with the shaft 1. Therefore, when the blades 22 are pushed by the gas LA, the rotor 22 and the shaft 1 will also rotate together, and then drive the cutting grinding sheet 3 and the fixture 4 sleeved on the shaft 1 to rotate, in this way, the cutting grinding sheet 3 can perform the cutting and grinding action.

During the process, in addition to the aforementioned blades 26 being pushed by the gas LA, as shown in FIG. 5 and FIG. 6, part of the gas LA will flow through the rotor channel 53, then flow into the shaft channel 51, and then flow to the gas channel 52 and be sprayed outward. Since the flow direction of the gas LA is parallel to the surface of the cutting grinding sheet 3, the remaining scraps on the surface of the cutting grinding sheet 3 and the cross section of the sample MA can be removed. In addition, the gas LA can cool the cutting grinding sheet 3 and the sample MA at the same time, so as to achieve the purpose of removing scraps and heat, and avoid damage to the cutting grinding sheet 3 and the sample M A due to scraps and high temperature. It can be seen that after the gas LA flows into the air intake opening 23, it can become the power to drive the rotor 22 to rotate, and it can also flow into the rotor channel 53 and the gas channel 52 and then be ejected outward to become the power of removing scraps and heat. It means that the design of the present disclosure can achieve both functions of driving and removing waste from a single source.

Figure 8:
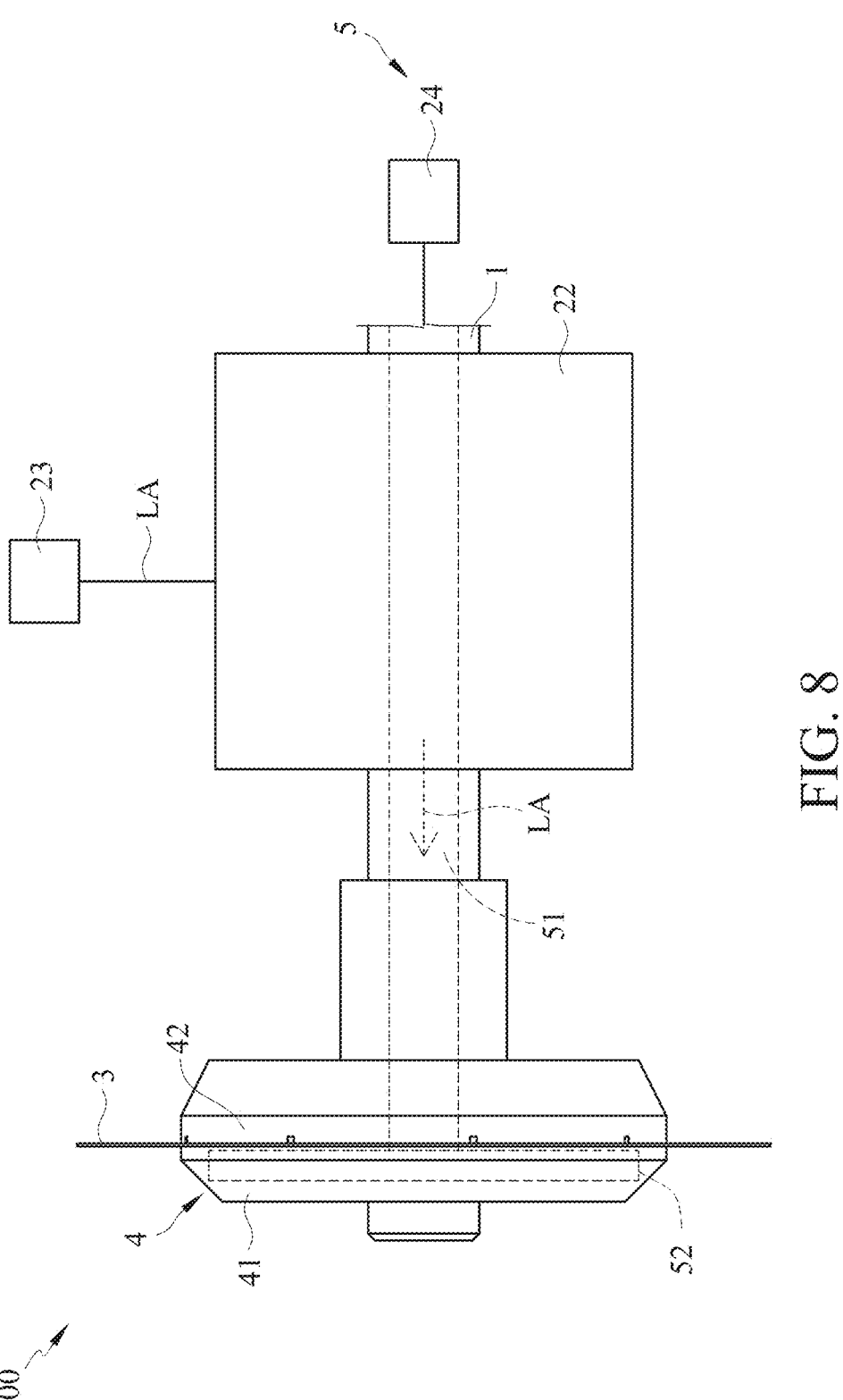
FIG. 8 is a schematic view of another embodiment of the material cutting and grinding device in accordance with this disclosure.

FIG. 8 is a schematic view of another embodiment of the material cutting and grinding device in accordance with this disclosure. Please refer to FIG. 8, in the material cutting and grinding device 100 of FIG. 8, the channel set 5 omits a plurality of rotor channels 53, and the air outtake opening 24 communicates with the shaft channel 51 (for convenience of illustration, the air intake opening 23 and the air outtake opening 24 are represented by boxes, and some components are omitted). In this way, the gas LA which flow out of the gas outtake opening 24 will be introduced into the shaft channel 51 to increase the gas flow rate flowing into the gas channel 52. In other words, the present disclosure can adjust the ratio of the gas entering the shaft channel 51 according to actual needs, so as to remove heat and shavings more efficiently.

Figure 9:
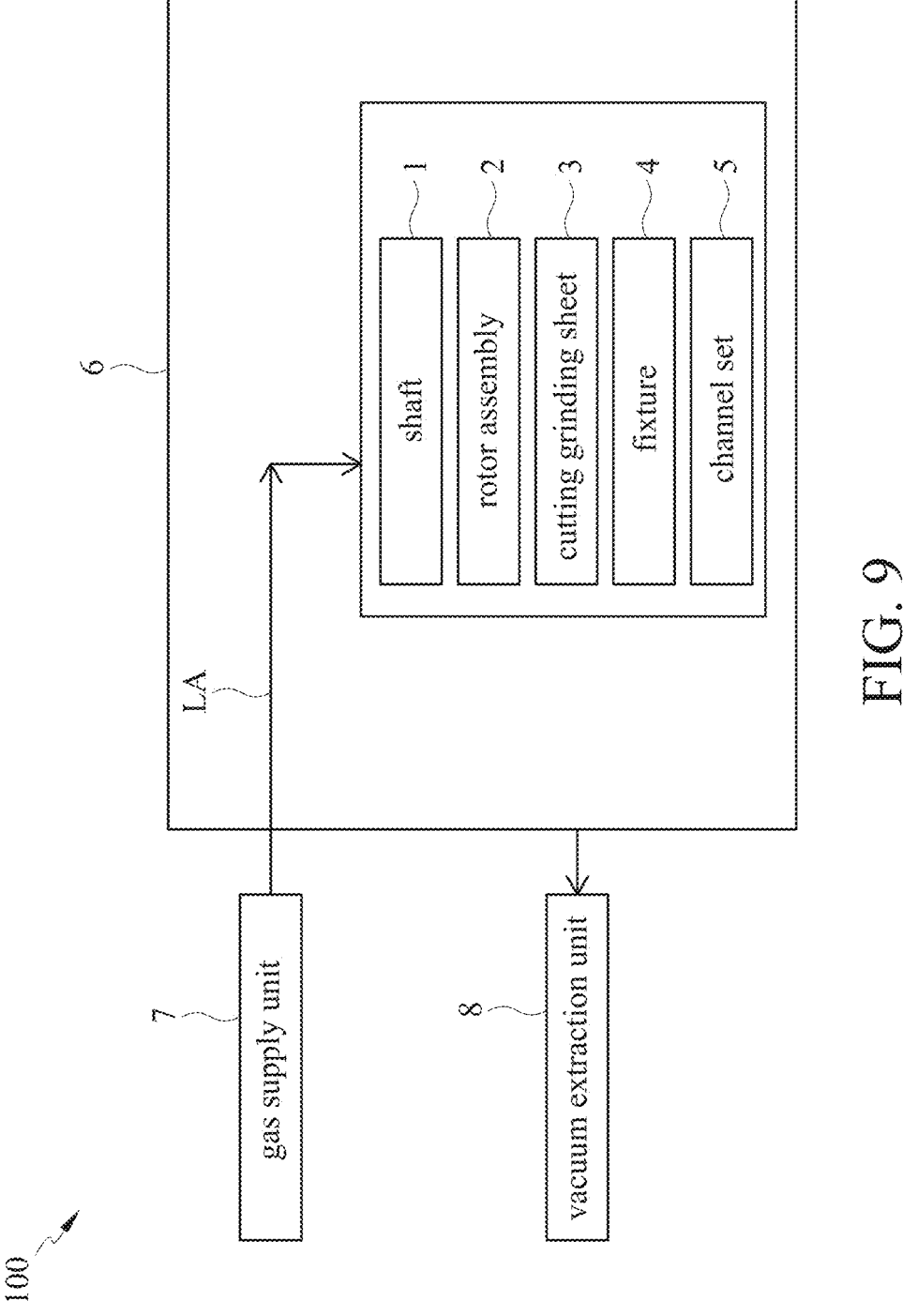
FIG. 9 is a schematic perspective view of another embodiment of the material cutting and grinding device in accordance with this disclosure.

FIG. 9 is a schematic view of another embodiment of the material cutting and grinding device in accordance with this disclosure. Please refer to FIG. 9, the material cutting and grinding device 100 in FIG. 9 further comprises a chamber 6, a gas supply unit 7 and a vacuum extraction unit 8, wherein the gas supply unit 7 and the vacuum extraction unit 8 are connected to the chamber 6 respectively. The chamber 6 can accommodate components such as the shaft 1, the rotor assembly 2, the cutting grinding sheet 3, the fixture 4, and the channel set 5 described in FIG. 1 to FIG. 8, wherein FIG. 9 illustrates boxes to represent components such as the shaft 1, the rotor assembly 2, the cutting grinding sheet 3, the fixture 4, and the channel set 5, and does not limit the positional relationship and connection relationship of the components. The usage of the chamber 6, the gas supply unit 7 and the vacuum extraction unit 8 can be adjusted according to the actual application field.

In one embodiment, the chamber 6 can be set as a portable suitcase, or the size of the chamber can be adjusted depending on the actual situation, and the chamber 6 can be set as a transparent chamber to view the components in the chamber 6. The gas supply unit 7 for example supplies the gas LA into the chamber 6. The gas LA can perform the above-mentioned cutting and grinding power to drive the sheet. At the same time, the gas LA can be jetted on the surface of the cutting grinding sheet to remove the scraps generated by cutting to replace the grinding polishing liquid, and further remove the heat generated by cutting and grinding, thereby protecting the cutting grinding sheet 3 and the sample.

In addition, in one embodiment, the vacuum extraction unit 8 can pump air inside the chamber 6, so as to extract the excess gas LA in the chamber 6. In other embodiments, the gas LA can be extracted from the chamber 6 according to the actual field, so that the chamber 6 is a sealed vacuum chamber.

For example, if applied to environmentally sensitive materials (such as battery materials), the gas supply unit 7 communicates with the air intake opening 23 as shown in FIG. 5 and provides the gas LA into the housing 21 and then into the channel set 5. Wherein, the gas LA is inert gas (such as nitrogen, argon, etc.), which provides environmental protection for environmentally sensitive materials in an inert gas atmosphere, so as to avoid oxidation of the cutting and grinding surface of the sample during the cutting and grinding process. After the gas LA flows out from the air outtake opening 24, it is sucked by the vacuum extraction unit 8, so as to maintain the state of the vacuum inside the chamber 6.

Figure 10:
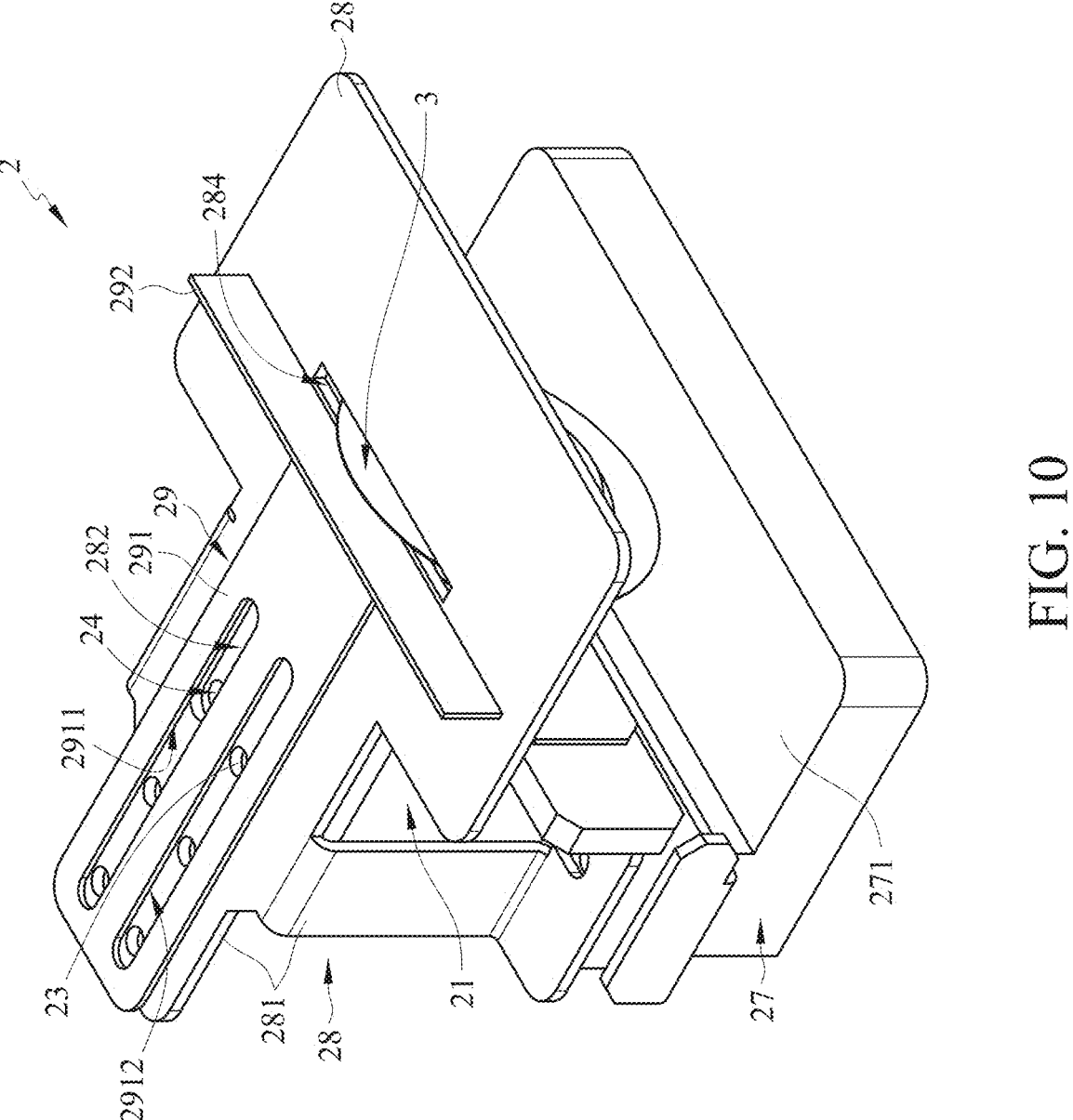
FIG. 10 is a schematic perspective view of another embodiment of the material cutting and grinding device in accordance with this disclosure.

FIG. 10 is a schematic perspective view of another embodiment of the material cutting and grinding device in accordance with this disclosure. The rotor assembly 2 of the present disclosure further includes a base 27, a connecting frame board 28, and a positioning board 29. Wherein, the connecting frame board 28 is connected on the base 27, and the connecting frame board 28 includes an outer frame body 281, a hole 282, an extending board body 283 and a through slot 284. The outer frame body 281 is used to accommodate the housing 21. In this embodiment, the outer frame body 281 is an inverted U-shaped frame. In other embodiments, the outer frame body 281 can be formed by locking two outer frames (For example, a first outer frame is vertically connected to the base 27, and a second outer frame is approximately vertically locked to the first outer frame to form an outer frame body together with the first outer frame). The hole 282 is formed on the outer frame body 281 and exposes the air outtake opening 24, wherein the air intake opening 23 can communicate with the gas supply unit 7 as shown in FIG. 9, and the air outtake opening 24 can communicate with the vacuum extraction unit 8 as shown in FIG. 9. The extending board body 283 is connected to and extends from one side of the outer frame body 281, and the through slot 284 is formed on the extending board body 283 for a part of the cutting grinding sheet 3 passing through.

The positioning board 29 is used to adjust the position of cutting and grinding. Taking FIG. 10 as an example, the positioning board 29 includes a locking area 291 and an abutting area 292, and the locking area 291 is connected to the abutting area 292. The locking area 291 is fixed on the outer frame body 281, and the locking area 291 includes a first slot 2911 and a second slot 2912. The first through slot 2911 and the second through slot 2912 can be used for the locking area 291 and the outer frame body 281 locking with each other in fixed manner. In addition, the position of a part of the first slot 2911 coincides with the position of the hole 282 to expose the air outtake opening 24. The present disclosure does not limit the number and the location of the above-mentioned slots of the locking area 291. The bottom side of the abutting area 292 is located above the extending board body 283, and the sample to be cut or ground is arranged between the abutting area 292 and the cutting grinding sheet 3, and the position of the cutting or grinding of the sample can be adjusted by the abutting area 292.

Figure 11:
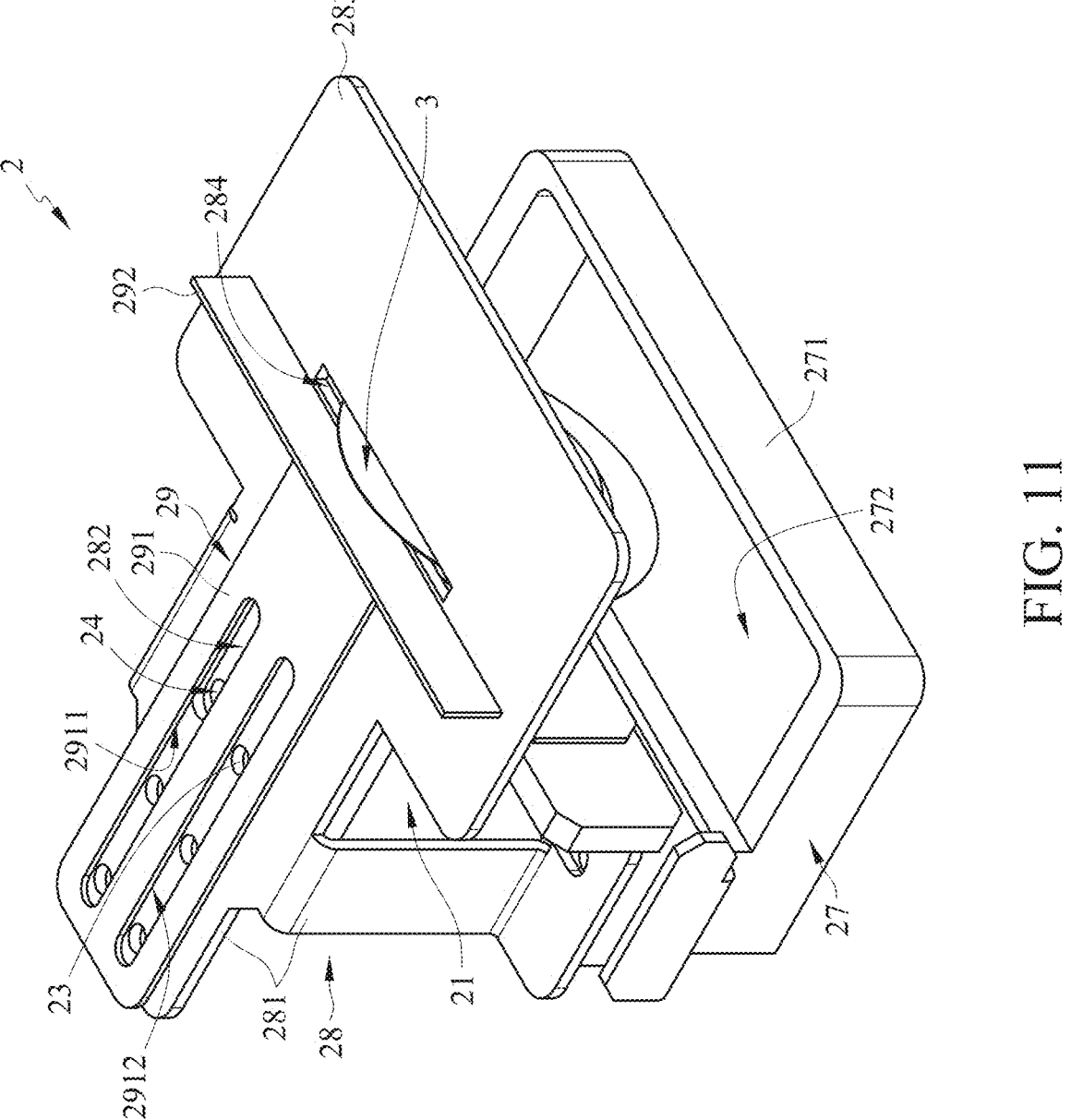
FIG. 11 is a schematic perspective view of another embodiment of the material cutting and grinding device in accordance with this disclosure.

It should be noted that one of the surfaces of the above-mentioned base 27 is a plane. However, the present disclosure does not limit the type of the base 27. In other embodiments, as shown in FIG. 11, the base 27 includes a base body 271 and a concave groove 272. The concave groove 272 is formed on the base body 271. In this way, the present disclosure can add an inert cryogenic liquid (such as liquid nitrogen, liquid argon) into the concave groove 272, thereby further enhancing the cooling function of the cutting grinding sheet 3 and the sample.

To sum up, the material cutting and grinding device of the present disclosure not only uses the gas as the power to drive the cutting grinding sheet to cut and grind, but also jets the gas to the surface of the cutting grinding sheet to remove the scraps generated by cutting and the heat generated by cutting and grinding at the same time, so as to protect the cutting grinding sheet and sample.

What is claimed is:
1. A material cutting and grinding device, comprising:
a shaft;
a rotor assembly disposed on an end of the shaft and including:
    a housing including a holding groove;
    a rotor accommodated in the holding groove and sleeved outside the shaft;
    an air intake opening and an air outtake opening respectively disposed at different positions of the housing, and respectively connected to the holding groove;
    a plurality of accommodating grooves penetrating along a radial direction of the rotor;
    a plurality of blades respectively penetrating in the accommodating grooves, and one end of each of the blades protruding outside the rotor;

a cutting grinding sheet connected to the other end of the shaft;
a fixture sleeved on the shaft and used for clamping the cutting grinding sheet; and
a channel set including a shaft channel and at least one gas channel, wherein the shaft channel penetrates through the shaft, the at least one gas channel is provided on the fixture, and the at least one gas channel is connected to the shaft channel;
    wherein, a gas enters the holding groove from the air intake opening and pushes the blades to drive the rotor and the shaft to rotate, thereby driving the cutting grinding sheet and the fixture to rotate, and the gas flows from the shaft channel to the at least one gas channel and then flows to the surface of the cutting grinding sheet.

2. The material cutting and grinding device of claim 1, wherein the at least one gas channel is formed in a concave manner on a surface of the fixture.

3. The material cutting and grinding device of claim 1, wherein the at least one gas channel is arranged along a radial direction of the fixture.

4. The material cutting and grinding device of claim 1, wherein one end of the shaft channel is located at a center of a surface of the fixture, and the at least one gas channel respectively includes a first end and a second end opposite to the first end, the shaft channel communicates with the first end of the at least one gas channel, and the first end of the at least one gas channel extends along a radial direction of the surface of the fixture to the second end of the at least one gas channel.

5. The material cutting and grinding device of claim 1, wherein the fixture includes a first clamping block and a second clamping block, the first clamping block and the second clamping block are respectively arranged on both sides of the cutting grinding sheet, and the at least one gas channel is arranged on at least one of the first clamping block and the second clamping block.

6. The material cutting and grinding device of claim 1, wherein the cutting grinding sheet includes a cutting area and a body area, the body area is a portion that overlaps the fixture in an axial direction of the rotor, the cutting area is arranged around the body area, the cutting area is a portion not overlapping the fixture along the axial direction of the rotor, and the gas flows through the at least one gas channel and sprays outward.

7. The material cutting and grinding device of claim 1, wherein the channel set further includes a plurality of rotor channels, the rotor channels are respectively penetrated along the radial direction of the rotor, the rotor channels are connected to the shaft channel, the rotor channels and the accommodating grooves are arranged in a staggered manner.

8. The material cutting and grinding device of claim 1, wherein the air outtake opening communicates with the shaft channel.

9. The material cutting and grinding device of claim 1, further comprising:
a chamber accommodating the shaft, the rotor assembly, the cutting grinding sheet, the fixture and the channel set;
a gas supply unit connected to the chamber; and
a vacuum extraction unit connected to the chamber.

10. The material cutting and grinding device of claim 9, wherein the chamber is a sealed vacuum chamber.

11. The material cutting and grinding device of claim 10, wherein the rotor assembly further includes a base, a connecting frame board and a positioning board, the connecting frame board is connected to the base, and the connecting frame board includes an outer frame body, an extending board body and a through slot, wherein the outer frame body accommodates the housing, the extending board body is connected to the outer frame body, the through slot is formed on the extending board body, a part of the cutting grinding sheet passes outside the through slot, and the positioning board is used to adjust the position of cutting and grinding.

12. The material cutting and grinding device of claim 11, wherein the base includes a concave groove.

13. The material cutting and grinding device of claim 12, wherein the concave groove is used to accommodate an inert cryogenic liquid.

\* \* \* \* \*